United States Patent [19]

Manfredi

[11] 3,996,398

[45] Dec. 7, 1976

[54] METHOD OF SPRAY-COATING WITH METAL ALLOYS

[75] Inventor: Pierre Manfredi, Orange, France

[73] Assignee: Societe de Fabrication d'Elements Catalytiques, St. Pierre de Senos, France

[22] Filed: July 25, 1975

[21] Appl. No.: 598,767

Related U.S. Application Data

[63] Continuation of Ser. No. 411,259, Oct. 31, 1973, abandoned.

[30] Foreign Application Priority Data

Nov. 8, 1972  France .............................. 72.39603

[52] U.S. Cl. .............................. 427/191; 427/319; 427/320; 427/321; 427/423
[51] Int. Cl.² ....................... B05D 3/02; B05D 1/08
[58] Field of Search .......... 427/191, 319, 320, 321, 427/423

[56] References Cited

UNITED STATES PATENTS

| | | |
|---|---|---|
| 2,775,531 | 12/1956 | Montgomery et al. ......... 427/191 X |
| 2,868,667 | 1/1959 | Bowles .......................... 427/191 X |
| 2,961,312 | 11/1960 | Elbaum ......................... 427/191 X |
| 3,711,310 | 1/1973 | Leeper .......................... 427/191 X |

OTHER PUBLICATIONS

Hall; Frank E., Flame-Sprayed Coating, 1965, pp. 59–64.

*Primary Examiner*—Michael R. Lusignan
*Attorney, Agent, or Firm*—Cameron, Kerkam, Sutton, Stowell & Stowell

[57] ABSTRACT

A metal coating is deposited on a metal substrate by means of a method which consists in sand-blasting the metal substrate, in heating the substrate to a temperature between 100° and 650° C, then in spraying a powder of nickel or cobalt alloy having a high value of hardness and containing reducing agents as well as agents for reducing the melting point, the spraying operation being performed at a distance of 50 to 200 mm from the nozzle of a spray-gun and at a velocity within the range of 100 to 250 meters per second.

6 Claims, No Drawings

METHOD OF SPRAY-COATING WITH METAL ALLOYS

This is a continuation of application Ser. No. 411,259, filed Oct. 31, 1973, now abandoned.

The present invention relates to improvements made in the application of metals by spraying onto metallic objects and is primarily concerned with the application of nickel or cobalt alloys having a high value of hardness.

These metals or alloys are usually applied either by welding of rods or by spraying of powder with a torch or spray-gun.

The torch is of the type used for welding of metal and serves to heat the substrate to a temperature in the vicinity of the temperature of fusion of the deposited powder; by means of a supply system placed on the torch, the powder is delivered onto the hot substrate and fuses in contact with this latter as a result of the heat produced by the flame which is maintained until smoothing of the deposited coating is achieved. The transferred-arc plasma torch process is based on a similar principle.

The spray-gun is the conventional tool for powdered-metal spraying or schooping. This gun is employed for depositing a coating which is then fused by means of a welding torch in order to obtain substantially the same result as before, that is to say a hard coating which is metallurgically welded onto the substrate. In this process, there is obtained prior to re-melting a highly porous coating which exhibits very weak adherence.

One method which has been proposed for improving these processes and dispensing with any need to handle powder consists in projecting powder as supplied in the from of a flexible cord and in re-melting the powder as soon as it is applied. The flexible cord has an internal core essentially composed of a mineral powder and an organic binder, said core being surrounded by an outer skin or sheath which is also formed of organic material and ensures mechanical strength, flexibility and storage stability of the cord as a whole. At the time of projection, the organic binder of the core and the outer sheath of organic material are consumed in the torch whilst the mineral powder which is projected in the state of molten particles forms on the substrate to which it is applied a coating which is both uniform and porous and which calls for subsequent remelting.

The powders employed in the practical application of this method require heating to at least 1000° C before they can be fused. It is quite clear that this high temperature has the effect of limiting the application of the method to objects which are capable of withstanding a temperature of this order without undergoing any deformation while also precluding the possibility of deposition on alloys or metals having melting points below the above mentioned value of 1000° C and on parts having at least one large dimension in comparison with the others, e.g. shafts having a ratio of length to diameter which is higher than 10:1, thin walls and so forth, and also on parts which have been subjected to a degradable thermal treatment by heating followed by cooling.

There has now been found a method whereby the properties of the metal deposits obtained can be improved even further. The invention is directed to a method of metallizing by spraying a metal coating onto a metal substrate, which consists in sand-blasting the metal substrate, in heating said substrate, in spraying a hard-metal powder of nickel or cobalt alloy, the spraying the operation being carried out at a distance of 50 to 200 mm from the metallizing device, reducing agents as well as agents for lowering the melting point being present in the metal powder, the method being characterized in that the metal substrate is heated to a temperature between 100° and 650° C and the spraying of the metal powder is carried out at a velocity within the range of 100 to 250 m/ sec.

The powder is sprayed in the form of a flexible cord by employing an atomization pressure within the range of 2 to 5 bars through an air-delivery nozzle having an orifice diameter within the range of 5 to 13 mm. The flexible cord preferably has a diameter of the order of 4.75 mm.

Similarly, it is possible to adopt methods of spraying in which the particles can be ejected at a velocity of more than 100 meters per second. Typical examples of such methods are those involving the use of the plasma torch or the explosion gun.

The metal powders employed in a satisfactory manner in this method essentially contain nickel associated with one or a number of the following elements: C, Cr, B, Si, Fe, W, Cu, Mo. They can also contain cobalt in association with one or a number of the following elements: C, Cr, Ni, B, Si, Fe, W, Mo.

Since the metal powder is projected at a high velocity while being completely melted, the deposit formed by the powder as it comes into contact with the part to be built-up with metal has a high density. This deposit has practically no porosity, constitutes a leak-tight screen between the part and the external medium and its adherence is considerably stronger than that of deposits formed by known methods. When boron and silicon are introduced in the powder, the result thereby achieved is to lower the melting point of the powder and therefore to modify the viscosity of the deposit in a favorable manner as well as to have a reducing action. As a consequence, the oxide films which are rapidly formed on the sand-blasted surface and on the particles of sprayed metal are broken under the impact of said particles and concentrate locally in the form of limited and unobjectionable agglomerates, thereby permitting contact between the base metal and the metal which is sprayed onto the greater part of the surface to be coated. This result is particularly effective if the sprayed metal has an affinity for the base metal. Such affinity gives rise to the formation of an intermediate layer having a high melting point as is the case, for example, when a nickel or cobalt alloy is sprayed onto an aluminum substrate.

The invention is illustrated by means of the following non-limitative examples:

EXAMPLE 1

A test is made on a shaft of XC42 steel. That portion of the shaft which is to be built-up must have a final diameter of 60 mm over a length of 120 mm. The part is machined to a preparation diameter of 59.2 mm, then blasted with angular corundum having a particle size of 0.5 mm.

The part is then mounted on a mandrel which rotates at a speed of 120 rpm, then pre-heated with a torch to a temperature of 520° C. As soon as the part is heated, a cord of Ni alloy having the following composition: Ni:71 — B:3.5 — Si:4.5 — Fe:4 — Cr:16.1 — C:0.9 and a diameter of 4.75 mm is sprayed with a wire gun fitted with an air-delivery nozzle having an orifice diameter of 8.5 mm and supplied with compressed air at a pressure of 4 bars. The spraying distance is 130 mm. The velocity of the majority of the particles is of the order of 100 to 250 m/sec. The part is then ground to the final size. The part has satisfactory adherence and has a slightly porous surface.

EXAMPLE 2

A pulley of aluminum-base alloy having a final external diameter of 146 mm and a width of 25 mm is machined to a diameter of 145.4 mm, then blasted with angular corundum having a particle size of 0.3 mm. The part is then placed on a shaft which rotates at 60 rpm and pre-heated to 390° C. As soon as the part is heated, 0.5 mm of Ni alloy having the following composition: Ni:83 — Cr:9 — B:1.7 — Si:3 — Fe:3 — C:0.3 is deposited with a wire gun supplied with a cord 4 mm in diameter. The air-delivery nozzle having an orifice diameter of 7.3 mm is supplied with compressed air at 3.8 bars. The spraying distance if 115 mm. After cooling, the part is ground to the final size, has a suitable surface and exhibits particularly good adherence.

What we claim is:

1. A method of improving the adherence of a metal coating on an aluminum substrate metallized by spraying a metal coating onto a metal substrate of aluminum or an aluminum base alloy, the steps of sand blasting the metal substrate, heating said substrate, spraying a hard-metal powder fusing above 1000° C of nickel or cobalt alloys on the substrate, the spraying operation carried out at a distance of 50 to 200 mm from the metallizing device, boron and silicon reducing agents for lowering the melting point being present in the metal powder, the metal substrate being heated to a temperature between 390° and 650° C and the spraying of the metal powder being carried out at a velocity within the range of 100 to 250 m/sec. causing an exothermic reaction with the formation of a high melting point intermediate layer between the coating and the substrate.

2. A method of metallizing in accordance with claim 1, wherein the powder is sprayed in the form of a flexible cord by employing an atomization pressure within the range of 2 to 5 bars through an air-delivery nozzle having an orifice diameter within the range of 5 to 13 mm.

3. A method of metallizing in accordance with claim 1, wherein the metal powder is a nickel alloy containing at least one of the elements selected from the group consisting of: C, Cr, B, Si, Fe, W, Cu, Mo.

4. A method of metallizing in accordance with claim 1, wherein the metal powder is a chromium alloy containing at least one of the elements selected from the group consisting of: C, Cr, Ni, B, Si, Fe, W, Mo.

5. A method of metallizing in accordance with claim 3, wherein the metal powder has the following composition by weight: Ni:71 — B:3.5 — Si:4.5 — Fe:4 — Cr:16.1 — C:0.9.

6. A method of metallizing in accordance with claim 3, wherein the metal powder has the following composition by weight: Ni:83 — Cr:9 — B:1.7 — Si:3 — Fe:3 — C:0.3.

* * * * *